E. THAYER.
Coffee Pot.
No. 61,030.
Patented Jan. 8, 1867.
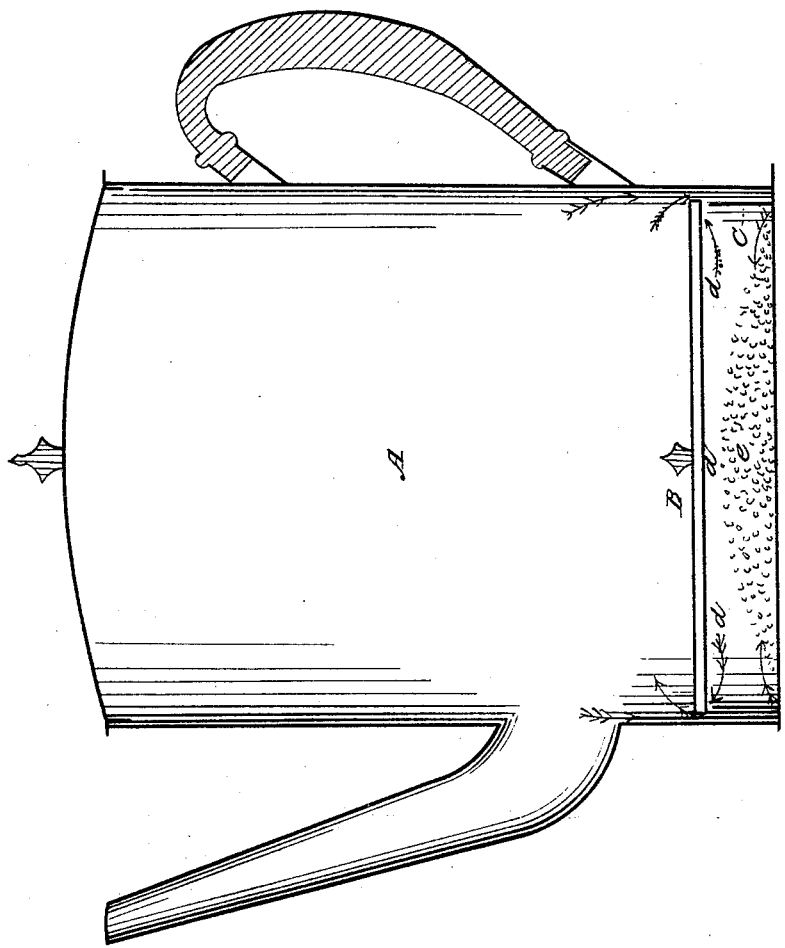
Witnesses
A. Arnold
C. F. Thayer
Inventor
E. Thayer

United States Patent Office.

ELI THAYER, OF NEW YORK, N. Y.

Letters Patent No. 61,030, dated January 8, 1867.

DECOCTING APPARATUS FOR TEA AND COFFEE.

The Schedule referred to in these Letters Patent and making part of the same.

Be it known that I, ELI THAYER, of the city, county, and State of New York, have invented a new and useful improvement in Decocting Apparatus; and I do hereby declare that the following is a full and exact description of the same, reference being had to the accompanying drawing, making a part of this specification.

My invention consists in a decocting apparatus, wherein the main body of water is partially separated from that portion which saturates the material from which the decoction is made, by some non-conducting material, whereby ebullition may be produced in the latter portion of water, and its vapor condensed by the former portion. As my decocter is simple in its construction, and as no aroma escapes in its operation, it is well adapted to the culinary purpose of making coffee, tea, and other beverages, and I will describe it as employed for that purpose.

The accompanying drawing is a vertical section of my improved decocter, wherein A represents an ordinary coffee or tea-pot, except that its diameter is uniform from top to bottom. B is a removable or false bottom; its side or rim, C, is only attached to its top at four points, as at d d d, and except at these points a small slit or space is left between C and the top of the dish, of sufficient size to admit of a free passage of vapor, but insufficient to admit the passage of coffee or tea grounds. B is made double, with a space between the two pieces of tin, which may be filled with some non-conducting material. This non-conducting plate intercepts both the heat and the circulation of the water. It should be nearly the diameter of A, but should not fit absolutely water-tight.

The operation of the decocter is as follows: Tea or coffee is placed on the bottom of A, as represented by e in the drawing; B is then placed over it, and cold water is poured into A, a portion of which finds its way into B, which should not make a water-tight joint where it rests on the bottom of A. Heat is now applied to the bottom of A, and the water in B soon commences to boil; vapor passes through the slit in the upper edge of the periphery of B, forming an upward current, as shown by the arrows, and is condensed by the water above B; then the colder portion of water in contact with the side of A descends and passes under the lower edge of C into B, thus continuing the circulation, boiling and condensing until the temperature of the entire mass of water in A reaches the boiling point, when the heat is removed and the beverage is ready for use. If preferred, C may be dispensed with, and the mere non-conducting plate which forms the top of B may be employed; the result will be nearly the same, but I prefer the arrangement shown.

Various devices may be employed as mere equivalents for those described; hence what I claim as my invention, and desire to secure by Letters Patent, is—

A decocting apparatus, wherein the main body of water is separated from that portion which saturates the material from which the decoction is made, by some non-conducting material which partially intercepts the heat and circulation, whereby ebullition may be produced in the latter portion of water, and its vapor condensed by the former and cooler portion, substantially as is herein set forth.

ELI THAYER.

Witnesses:
A. ARNOLD,
B. FRANKLIN CLARK.